Patented Mar. 16, 1948

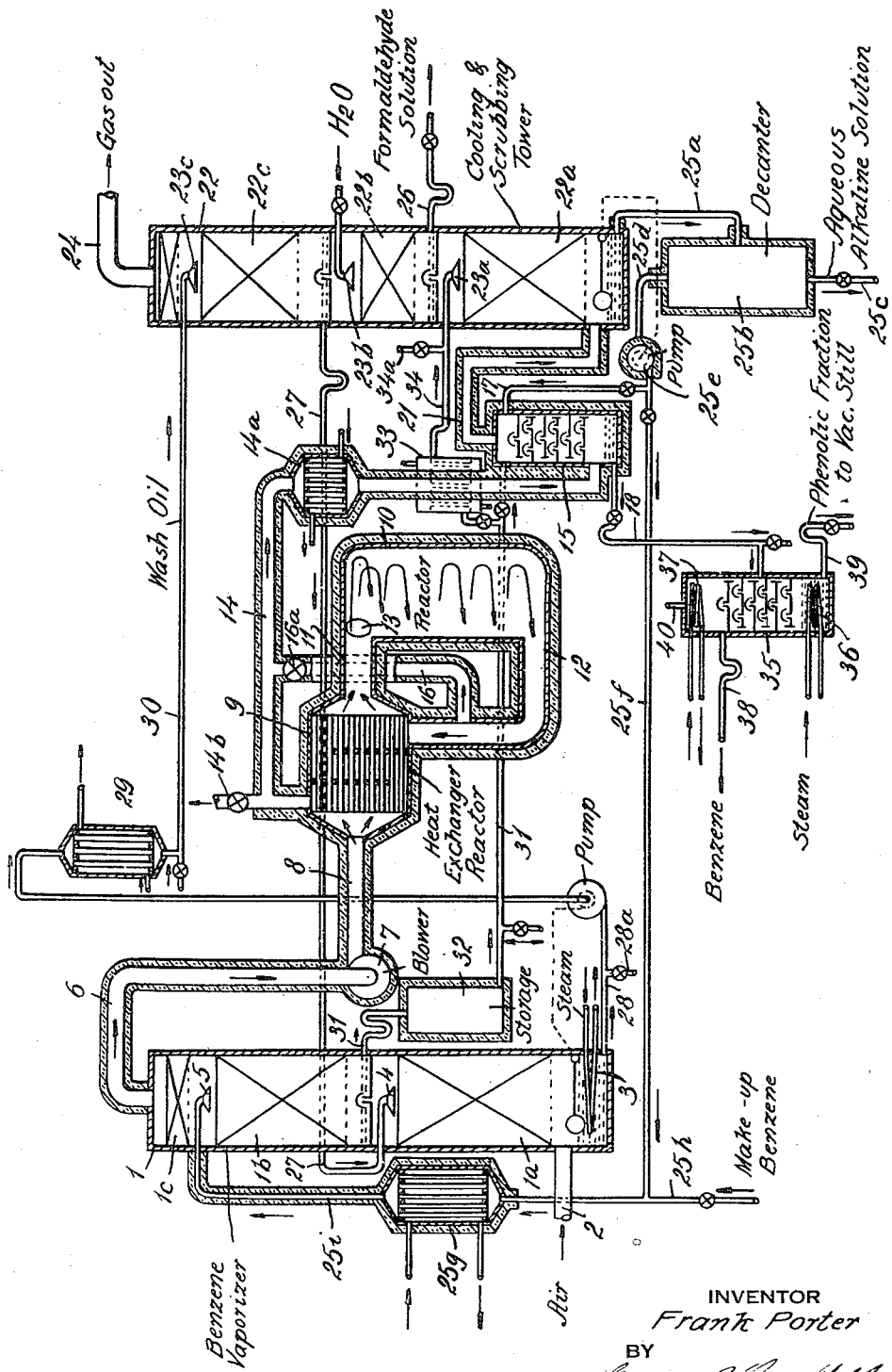

2,437,921

UNITED STATES PATENT OFFICE 2,437,921

PHENOL RECOVERY

Frank Porter, Syracuse, N. Y., assignor to Allied Chemical & Dye Corporation, a corporation of New York Application December 28, 1940, Serial No. 372,062

12 Claims. (Cl. 260—621)

This invention relates to the recovery of phenol from vapor mixtures formed by the vapor phase oxidation of benzene by means of oxygen-containing gases.

The invention is particularly directed to a recovery method which effects recovery of phenol without chemical reaction thereof with alkalis.

In United States Patent 2,223,383 of Wendell W. Moyer and William C. Klingelhoefer there is described and claimed a process for the manufacture of phenol by subjecting benzene to oxidation at elevated temperatures by means of an oxygen-containing gas, at normal atmospheric pressures or at higher or lower pressures, and in the absence of catalytically effective quantities or areas of oxidation-promoting catalysts. The recovery process of the present invention is especially adapted for the treatment of reaction mixtures of such processes.

In United States Patent 1,547,725 of C. H. Bibb there is described a process for the oxidation of benzene to phenol by means of air using oxides of nitrogen as catalysts. The recovery process of the invention is also applicable to recovery of phenol from reaction mixtures obtained in such processes.

The above mentioned Moyer and Klingelhoefer patent discloses recovery of phenol from vaporous reaction mixtures of the above described type by washing the mixtures with benzene condensate obtained in a later cooling step. In the practical application of this procedure, I have found that appreciable quantities of aqueous organic acidic material, mainly formic acid, and sometimes sulfurous acid, appear in the phenol recovery unit. This material is highly corrosive to ordinary carbon steel or iron equipment. Even if the benzene condensate is first used to enrich gases passing to the reactor and only residue from this vaporization is used for recovering phenol, the corrosive acidic materials appear in the phenol recovery unit. The presence of these materials in the phenol recovery unit may be explained on the basis that the benzene condensate contains an acidic aqueous phase entrained or suspended in the benzene. If this condensate is employed to supply benzene to the reactor, the aqueous condensate, including acidic constituents, is eliminated from the benzene, but the resulting vapors increase the proportions of acidic constituents and water in the reaction mixture entering the phenol recovery until their concentration is such that they condense in this unit. Whether this acidic aqueous phase is introduced into the phenol recovery unit by condensation therein or by entrainment in the benzene cooling liquid, its presence therein causes rapid deterioration of the recovery unit unless the unit is constructed of or lined with materials resistant to acid-corrosion. Acid-resistant structural materials, for example the chromium, chromium-nickel, or chromium-nickel-molybdenum steels, are relatively costly and hence add materially to the capital outlays required.

In accordance with the present invention reaction vapor mixtures of the types discussed above are subjected to a washing treatment with a non-aqueous scrubbing liquid, preferably a neutral hydrophobic solvent for phenol, at a temperature above the dew point of water in the vapor mixture, and in the absence of aqueous condensate from the vapor mixture.

The present invention may be applied to the recovery procedure of the Moyer and Klingelhoefer patent in a very simple manner for I have found that corrosive constituents may be removed from benzene condensate by simple decantation, provided sufficient time is given for the separation, and accordingly it is only necessary to pass the benzene condensate to a decanter of adequate dimensions before passing the benzene condensate into the phenol recovery unit or into the benzene vaporizer. I have found that this simple procedure eliminates corrosion difficulties in the phenol recovery unit so that ordinary structural materials such as mild steel may be used satisfactorily.

In general reaction mixtures of the type involved in the present invention may be obtained by reacting elemental oxygen gas, which may be diluted with inert gases or vapors such as nitrogen, carbon dioxide, or steam, with benzene by subjecting a mixture of oxygen and benzene vapor in a mol or volume ratio between about 0.02 and 0.8 to a temperature between 200° and 1000° C. at absolute pressures from as high as 1000 atmospheres down to as low as ½ atmosphere or less.

Atmospheric pressure operations involving, for example, absolute pressures between ½ atmosphere and 2 atmospheres may be conducted to advantage, in the absence of catalysts, at temperatures between 600° and 800° C. using air and benzene vapor in a mol ratio between 0.5 and 1.5.

The dew point of water in such mixtures is usually below 50° C. and accordingly the recovery of phenol may be effected by scrubbing the gases at a temperature above 50° C. without encountering corrosion difficulties.

It is preferred to effect recovery of phenol by countercurrent direct contact cooling or scrubbing with hydrocarbon liquid at an absolute pressure between ½ atmosphere and 2 atmospheres in a gas temperature range from between 70° C. and 100° C. at gas inlet down to between 50° C. and 60° C. at gas outlet using liquid at a liquid inlet temperature between 40° C. and 60° C. and a liquid outlet temperature between 70° C. and 100° C.

Benzene is an especially satisfactory hydrophobic phenol solvent since it is readily separable from phenol by fractional distillation and since it already constitutes a large proportion of the reaction vapor mixture and hence its use as solvent entails no extra steps for recovering solvent vaporized by the hot vapor mixture in the absorber or scrubber.

By countercurrent washing with benzene in the manner described above, all but a very small proportion of the phenol content of the reaction mixture is recovered in the absorber-scrubber.

After separation of phenol from the reaction vapor mixture, the residual mixture may be treated to recover other constituents contained therein. A satisfactory method of treatment involves cooling the vapor mixture by direct contact with a cooling liquid, for example benzene. By cooling the vapor mixture in this manner to a temperature around 30° C. most of the benzene and less volatile reaction products still present may be removed from the vapor mixture. Thus, any residual phenol, diphenyl, naphthalene and terphenyl, and most of the benzene are removed. Since in this temperature range, that is, between about 30° C. and about 50° C., an aqueous phase containing acidic constituents, particularly formic acid and, in case a benzene not free from sulfur has been employed, sulfurous acid, and in the Bibb process, nitrous acids, condenses, the condensate recovered from the gas is decidedly corrosive. It is possible to eliminate corrosion by employing corrosion-resistant materials for the benzene recovery unit. Further, since lower temperatures are involved in this unit than in the phenol recovery unit, the corrosion is less severe than would occur in the phenol recovery unit in the event the aqueous phase were permitted to pass into the latter unit. However, I have found that corrosion difficulties in the benzene condenser may be eliminated by reducing the acidity of the condensate, and I prefer to employ a benzene condensation step carried out under substantially neutral or mildly alkaline conditions maintained by adding a suitable alkaline reagent in the condensation step. Suitable alkaline agents are sodium carbonate, sodium bicarbonate, sodium phenate, or sodium hydroxide.

There follows an example of one embodiment of the present invention.

In the accompanying drawing the numeral 1 designates a contact tower containing suitable packing and arranged for introducing benzene into air to be employed in the process. The tower may be constructed of any convenient material, steel for example, and the packing may be of similar or dissimilar material.

The tower 1 is provided with a lower section 1a for stripping benzene from an oil benzene solution and an upper section 1b for saturating the air with additional benzene. At the bottom of the tower an air inlet 2 is provided so that air introduced into the tower passes up therethrough countercurrent to descending streams of oil and benzene in section 1a and benzene in section 1b. Each of these sections may be provided with suitable packing to assure adequate surface contact of the liquid with the gas. At the bottom of the tower a steam coil 3 may be arranged for heating oil and exhausting it of its benzene content. Hot benzene-oil mixture is introduced into section 1a by means of spray head 4 and benzene is introduced into section 1b by means of spray head 5. An additional packed section 1c may be arranged at the top of the tower for removing any entrained spray from the gas. From the top of the tower 1 gas conduit 6 leads to blower 7 adapted to force the air-benzene vapor mixture through the system. Blower 7 is connected by conduit 8 to a heat exchanger 9 which serves as the initial section of the reaction chamber. This heat exchanger is shown as a tubular interchanger of the indirect type which may be constructed of a material such as aluminum-coated chromium-iron. However, any suitable construction may be employed. Heat exchanger 9 is connected directly to a reaction chamber 10 of any suitable type such as to provide the required reaction time while exposing the gases to a minimum of contact surface. The reactor illustrated comprises a cylindrical chamber having a tangential inlet 11 and a tangential outlet pipe 12 so that the gases are given a spiral motion and hence any dead spots are avoided and the gas moves progressively through the reactor. A steel vessel lined with ceramic material such as fused silica may be used. At the top of the reaction chamber a gas inlet pipe 13 is shown for introducing combustion gas or other heating medium for initially bringing the reaction chamber to operating temperature. Pipe 12 leads directly from the reactor into the hot side of preheater 9, which thus serves to transfer heat from the reaction products to the ingoing reaction mixture.

Conduit 14 leads from the hot side of the interchanger 9 through a cooler 14a, cooled by any suitable fluid and arranged to give uniform temperature control, to the bottom of a conventional bubble tray column 15, which may be constructed of ordinary mild steel such as employed for conventional columns where acid-resistance is not a factor. Outlet pipe 14b is provided for drawing off the hot gas used for initially heating the reactor. Between pipes 12 and 14 a by-pass 16 having a regulating valve 16a is arranged to shunt the heat exchanger 9 so as to control the temperature in the reaction zone within the desired range.

Column 15 has an inlet pipe 17 for benzene at the top and an outlet 18 for condensate at the bottom. Gas conduit 21 leads from the top of the bubble tray column to the bottom of a scrubbing tower 22.

Scrubbing tower 22 comprises a lower section 22a wherein the gases are cooled by countercurrent contact with benzene, a section 22b wherein the cooled gases are washed with water for removal of formaldehyde and other volatile materials, and a section 22c wherein the cooled gases are finally scrubbed with wash oil such as the straw oil employed for absorbing benzene from coke oven gases. The several sections of the tower are provided with suitable packing and spray heads 23a, 23b, and 23c for introducing the scrubbing fluids. From the top of the scrubbing tower gas conduit 24 leads to suitable gas disposal means. Since the gas resulting from the process has some fuel value, it may be used for various heating purposes. The various parts of tower 22 may be constructed of the materials usually employed for such units.

From the bottom of section 22a of the scrubbing tower, pipe 25a leads to a decanter 25b having an outlet 25c at the bottom and an outlet pipe 25d leading to a pump 25e. Pump 25e is connected by pipe 25f which leads to a heat exchanger 25g. Line 25f is connected with pipe 17 leading to the top of column 15. A valved inlet 25h for make-up benzene also is provided on line 25f. Heat exchanger 25g is joined to spray head 5 by a pipe 25i.

At the bottom of section 22b a pipe 26 is provided for drawing off aqueous formaldehyde solution. Arrangement may be made for recirculating this solution to build up its formaldehyde content if desired. However, straight countercurrent circulation provides a more satisfactory recovery. From the bottom of section 22c a pipe 27 leads to spray head 4 in section 1a of tower 1.

Tower 1 at its bottom has a liquid outlet pipe 28 provided with a valved outlet branch 28a. Pipe 28 leads to cooler 29 connected to oil inlet pipe 30 of scrubbing section 22c. From section 1b of tower 1 outlet pipe 31 leads to storage tank 32 and thence to the top of bubble tray column 15 and also to a heat exchanger 33 from which the pipe-line 34, which is provided with a valved inlet 34a, leads to spray head 23a of section 22a.

Outlet pipe 18 from column 15 leads to the center of a distillation column 35. This column may be of conventional construction having a heating coil 36 at the bottom and a cooling coil 37 at the top and outlets 38 and 39 at the top and bottom respectively for withdrawal of distillate and distillation residue. Vapor outlet 40 is provided for exit of any uncondensed gases.

It should be understood that where steel is employed in the apparatus above described, corrosion-resistant alloy steels, such as the chromium or chromium nickel steels, or simple carbon steels may be used.

While contact devices of the packed tower type have been illustrated in the drawing, other contact means may be used to advantage. Thus spray contact devices of low pressure drop, such as the spray roll contact apparatus of United States Patent 1,958,586 of Stuart Parmelee Miller, or the various contact apparatuses of Miller Patent 1,958,440, may be employed to particular advantage because of their high efficiency and low operating cost. When such an apparatus is employed, it may be advantageous to provide the requisite heating or cooling coils for heating or cooling the gases within the spray chamber itself, say at the bottom thereof, so that efficient heat exchange is obtained.

The apparatus illustrated may be operated for the production of phenol from benzene in the following manner.

Air enters tower 1 by means of inlet 2 and passes up through section 1a countercurrent to a flow of benzene and stripping oil mixture whereby the air vaporizes the benzene from the mixture. The air and benzene-oil mixture both enter section 1a at about 30° C. and it is desirable that the air enter the benzene vaporizing section 1b at a temperature around 50° C. or 60° C. Oil collecting at the bottom of the tower may be heated by steam coil 3 in order to further remove benzene, and the resultant oil freed of the benzene may be returned by pipe 28 to cooler 29 for reuse as stripping oil in a manner to be hereinafter described. By regulating the heating of the body of oil a portion of the oil may be vaporized to supply the necessary heat for raising the temperature of the air and also for vaporizing the benzene. The oil vaporized will be cooled by the air and condensed and will return to the bottom of the tower.

The air containing vapors of benzene from the benzene-stripping oil mixture next passes through section 1b of tower 1 where it contacts countercurrently with benzene introduced through spray head 5 and preheated in preheater 25g to a temperature around 60° C. The benzene may be a crude product containing the impurities normally associated therewith as it has been found that such impurities do not adversely affect the reaction. In this manner a mixture of air and benzene vapor in about equimolecular proportions is produced at a temperature around 55° C. or 60° C. Excess benzene, not vaporized by the air, passes out at the bottom of section 1b through pipe 31 to storage tank 32. Air-benzene vapor mixture drawn by blower 7 at a rate such as to give a space velocity of 350 or thereabouts in that part of the heat exchanger 9 and reactor 10 maintained above 500° C. (corresponding to a reaction time of about 2½ to 3½ seconds) passes to heat exchanger 9 where its temperature is raised to about 600° C. The mixture then enters reactor 10 where by the heat of reaction it is further heated to about 800° C. At 800° C. the reaction mixture enters the hot side of heat exchanger 9 and gives up its heat to ingoing mixture thus being cooled to about 260° C.

The reaction mixture is further cooled in heat exchanger 14a to about 85° C. and enters column 15 at this temperature. In column 15 the reaction mixture passes upwardly countercurrent to a flow of benzene, which is introduced at the top of the tower at a temperature around 40° C. This benzene may be supplied either from storage tank 32 by way of pipe 31 or from decanter 25b by way of pipe 25d and branch pipe 17. The contact of the reaction gas mixture with the cooler benzene results in the condensation or absorption of phenol, diphenyl, naphthalene, and other materials relatively high-boiling, compared with the benzene. It is preferred to control the entering gas temperature and the entering benzene temperature and the amount of benzene supplied so as to cool the gases to a temperature of about 58° C. and heat the benzene to about 85° C. A benzene-condensate mixture is thus obtained containing about 50 mol per cent of benzene. This mixture may be caused to flow through pipe 18 to a distillation column 35 for separation of benzene from high-boiling constituents. It will be noted that while column 35 is shown as separate and independent from column 15, it may be combined therewith, if desired, forming a lower section of column 15. The phenolic residue, consisting of 80 parts phenol and the balance diphenyl, naphthalene, and other materials, perhaps wash oil constituents and condensation products resulting from the condensation of phenol with formaldehyde present in the reaction gases, may be withdrawn from the bottom of column 35 and conducted to a vacuum still (not shown) for recovery of phenol therefrom. The benzene recovered may be returned to the system for further use.

The reaction gases pass from the top of column 15 to scrubbing tower 22. Here they first are brought into intimate contact countercurrently with benzene introduced through spray head 23a. This benzene may be drawn by way of pipes 31 and 34 from storage tank 32 or partly or entirely from some other source, as the fresh benzene supply, but is preferably introduced into section 22a of the tower at a temperature around 29° C. Sufficient benzene should be introduced to cool the gas mixture down to about 30° C., additional benzene being supplied, if required, for this purpose. By this cooling of the gases the major portion of the benzene is condensed and collected at the bottom of section 22a from which it may be conducted back through decanter 25b and preheater 25g to spray head 5, after the addition of make-up benzene through branch 25h, if necessary. Whether this addition will or will not be necessary in any particular case, of course, depends upon whether additional benzene has been supplied through pipe 31 and also whether benzene from the bottom of section 22a is being used for supplying column 15.

Tower 22 may be constructed of a corrosion-resistant alloy steel. However, I prefer to avoid the use of such relatively expensive materials of construction, and for operation with a tower, the shell of which is composed of a mild carbon steel and the packing or checkerwork is of ceramic material, I introduce a mildly alkaline solution through branch 34a. This alkaline solution mixes with the benzene and enters the section 22a through spray head 23a. A quantity of 10% aqueous sodium carbonate solution amounting to about 0.05% by weight of the benzene passing through pipe 34 is adequate for maintaining the aqueous condensate recovered in section 22a in a mildly alkaline condition, e. g. with a pH of about 7 to 8. Condensate and cooling liquid pass down through section 22a countercurrently to gases flowing therethrough and remove from the gases the major proportion of benzene, substantially all of the acidic constituents (including residual phenol), and residual diphenyl, terphenyl, and naphthalene. This condensate mixture passes to decanter 25b where the aqueous phase separates and may be withdrawn through outlet 25c either intermittently or continuously. The aqueous solution thus withdrawn may be treated for recovery of its acidic constituents. For example, phenol and formic acid present as salts may be recovered and isolated by acidification and fractional distillation. The oil layer which separates in decanter 25b passes out through pipe 25d to pump 25e, which may be controlled by a constant level device in the base of section 22a to coordinate withdrawal of benzene and aqueous liquor from section 22a with inflow through line 34.

Instead of using a mixture of benzene and aqueous alkaline solution for cooling vapors in section 22a, the cooling may be conducted entirely by means of aqueous alkaline solution. For operating in this manner the quantity of aqueous solution should be increased to provide the requisite heat removal and the benzene balance should be adjusted to compensate for the smaller quantities of benzene leaving section 22a; sections 22a and 22b may be combined into a single section employing the aqueous alkaline solution as cooling agent and absorbent without objectionably increasing the formaldehyde content of the exit gases. When aqueous alkaline solution is used in large quantities, either alone or with benzene, it should be passed through a heat exchanger to reduce its temperature before being recirculated to section 22a.

It will be noted that any constituents such as diphenyl, etc. not recovered in column 15 will be washed out from the gases with the benzene in section 22a. By supplying benzene from this section to the column 15, any such constituents contained will be recovered along with the phenol, diphenyl, etc. condensed from the gases in this column. A similar result eventually takes place with benzene circulated back to tower 1 by way of return pipe 25f. Even if such constituents are vaporized in section 1b, their relative proportion in the gas mixture will be negligible compared with the quantities produced by the reaction and consequently they will pass along through the system without any substantial effect upon its operation.

Reaction gases cooled to a temperature around 30° C. in section 22a pass into section 22b where they are washed countercurrently with water for removal of formaldehyde. The amount of water is controlled to produce a solution of about 10% formaldehyde concentration. The resultant formaldehyde solution is drawn off through pipe line 26. The gases then pass up through section 22c where they are washed countercurrently with wash oil introduced through spray head 23c. This oil may be a petroleum distillate fraction such as the straw oil commonly employed at coke oven plants for recovering benzene. The wash oil should be introduced at as low a temperature as possible in order to effect a maximum elimination of benzene from the gases. Fresh wash oil and wash oil recovered from the bottom of section 1a of tower 1 and cooled in heat exchanger 29 to a temperature of about 30° C. or lower may be used advantageously. In this way the benzene content of the exit gases can be reduced to as low as .1% or lower. Analyses have shown such gases to contain on the order of 15% carbon monoxide together with a few percent of hydrogen, methane, and ethylene. Consequently these gases possess appreciable heating value and can be used for heating purposes.

I claim:

1. In the recovery of phenol from the vapor mixture formed by the vapor phase oxidation of benzene to phenol at elevated temperatures, the improvement which comprises washing the reaction vapor mixture containing phenol and water vapor with benzene at ½ to 2 atmospheres pressure and at a temperature above 50° C. at which there is no condensation of water from said vapor mixture, cooling the washed mixture to condense benzene and an aqueous condensate, separating the benzene and aqueous condensate, and using at least a part of the thus dewatered benzene as wash liquid for washing phenol from additional reaction vapor mixture.

2. In the recovery of phenol, benzene, and by-products from a vapor mixture formed by the vapor phase partial oxidation of benzene to phenol at elevated temperatures in a system involving a benzene vaporizer, an oxidation zone, a phenol washer and a benzene condenser, the improvement which comprises washing in the phenol washer the reaction vapor mixture from the oxidation zone while yet at a temperature above the dew point of the water in said vapor mixture with benzene, which is free from aqueous condensate from the mixture, so as to wash phenol from the mixture, thereafter cooling the vapor mixture in said benzene condenser so as to condense benzene and an aqueous condensate, separating the benzene condensate from the aqueous condensate, and returning the benzene condensate to said system at a point ahead of the benzene condenser.

3. In the recovery of phenol, benzene, and by-products from a vapor mixture formed by the vapor phase partial oxidation of benzene to phenol at elevated temperatures, the improvement which comprises washing the reaction vapor mixture while yet at a temperature above the dew point of the water in said vapor mixture with benzene, which is free from aqueous condensate from the mixture, so as to wash phenol from the mixture and thereafter washing the vapor mixture with sufficient cool aqueous alkaline solution to condense a major part of the benzene from the vapor mixture.

4. In the recovery of phenol from the vapor mixture formed by the vapor phase partial oxidation of benzene to phenol by subjecting to a temperature between about 600° C. and 800° C. at a pressure between about ½ and about 2 atmospheres absolute a mixture of benzene vapor and oxygen-containing gas containing a volume ratio of elemental oxygen to benzene vapor between about 0.02:1 and about 0.8:1, thereby forming a reaction vapor mixture comprising phenol, unreacted benzene, water, and a minor proportion of organic acidic material, the improvement which comprises washing the reaction vapor mixture countercurrently with benzene while the vapor mixture is yet at a temperature between 50° C. and 100° C. thereby removing phenol from the vapor mixture and contacting the resulting vapor mixture with cool benzene and an alkaline reagent so as to condense benzene and an aqueous condensate, separating said condensed benzene from aqueous condensate and employing a part of the separated benzene to wash phenol from additional vapor mixture.

5. In the recovery of phenol from the vapor mixture formed by the vapor phase partial oxidation of benzene to phenol by subjecting to a temperature between about 600° C. and 800° C. at a pressure between about ½ and about 2 atmospheres absolute a mixture of benzene vapor and oxygen-containing gas containing a volume ratio of elemental oxygen to benzene vapor between about 0.02:1 and about 0.8:1, thereby forming a reaction vapor mixture comprising phenol, unreacted benzene, water, and a minor proportion of organic acidic material, the improvement which comprises washing the reaction vapor mixture countercurrently with benzene while the vapor mixture is yet at a temperature between 50° C. and 100° C. thereby removing phenol from the vapor mixture, contacting the resulting vapor mixture with cool benzene and an alkaline reagent so as to condense benzene and an aqueous condensate, separating said condensed benzene from aqueous condensate, vaporizing a part of the separated benzene condensate and passing it, in admixture with oxygen-containing gas, to the oxidation zone, and using a second part of the separated benzene as washing agent to remove phenol from additional vapor mixture.

6. In the manufacture of phenol by the vapor phase partial oxidation of benzene to phenol by subjecting to a temperature between about 200° and 1000° C. a mixture of benzene vapor and oxygen-containing gas containing a volume ratio of elemental oxygen to benzene vapor between about 0.02:1 and about 0.8:1, thereby forming a reaction vapor mixture comprising phenol, benzene, water, and a minor proportion of organic acidic material, the improvement which comprises washing the reaction vapor mixture countercurrently with benzene while the vapor mixture is yet at a temperature between the dew point of water therein and the boiling point of benzene at the prevailing pressure, thereby recovering phenol from the mixture, contacting the remaining vapor mixture with sufficient cool aqueous alkaline solution to condense a major part of the benzene vapor and an aqueous condensate, separating the aqueous solution from the benzene condensate, and using at least a part of the separated benzene condensate as washing agent to remove phenol from additional vapor mixture.

7. In the manufacture of phenol by the vapor phase partial oxidation of benzene to phenol by subjecting to a temperature between about 200° and 1000° C. a mixture of benzene vapor and oxygen-containing gas containing a volume ratio of elemental oxygen to benzene vapor between about 0.02:1 and about 0.8:1, thereby forming a reaction vapor mixture comprising phenol, benzene, water, and a minor proportion of organic acidic material, the improvement which comprises washing the reaction vapor mixture countercurrently with benzene while the vapor mixture is yet at a temperature between the dew point of water therein and the boiling point of benzene at the prevailing pressure, thereby recovering phenol from the mixture, contacting the remaining vapor mixture with sufficient cool aqueous alkaline solution to condense a major part of the benzene vapor and an aqueous condensate, separating the aqueous solution from the benzene condensate, vaporizing a part of the separated benzene condensate and passing it, in admixture with oxygen-containing gas, to the oxidation zone.

8. In the recovery of phenol from the vapor mixture formed by the vapor phase partial oxidation of benzene to phenol by subjecting to a temperature between about 600° C. and 800° C. at a pressure between about ½ and about 2 atmospheres absolute a mixture of benzene vapor and oxygen-containing gas containing a volume ratio of elemental oxygen to benzene vapor between about 0.02:1 and about 0.8:1, thereby forming a reaction vapor mixture comprising phenol, unreacted benzene, water, and a minor proportion of organic acidic material, the improvement which comprises washing the reaction vapor mixture countercurrently with benzene while the vapor mixture is yet at a temperature between 50° C. and 100° C. thereby removing phenol from the vapor mixture, contacting the resulting vapor mixture with cool aqueous alkaline solution so as to condense benzene and an aqueous condensate, separating said condensed benzene from aqueous solution, and employing a part of the separated benzene to wash phenol from additional vapor mixture.

9. In the manufacture of phenol by the vapor phase partial oxidation of benzene to phenol by mixing benzene vapor with gaseous oxygen and reacting the benzene and oxygen, thereby forming a reaction vapor mixture comprising phenol, benzene, water and a minor proportion of organic acidic material, the improvement which comprises washing the reaction vapor mixture in the absence of an aqueous liquid with liquid benzene while maintaining the vapor mixture at temperatures above the dew point of the water therein at which the phenol is absorbed in the liquid benzene but most of the non-phenolic content of the vapor mixture remains in the vapor phase, cooling the remaining vapor mixture to a temperature at which the benzene vapor is condensed therefrom to form liquid benzene together with an aqueous condensate, separating the aqueous condensate from the liquid benzene, and returning the thus recovered benzene in part to the aforedescribed step wherein benzene vapor is reacted with gaseous oxygen and in part as washing agent to the step wherein the reaction vapor mixture is washed with liquid benzene to recover phenol therefrom.

10. In the recovery of phenol, benzene, and acidic by-products from a vapor mixture formed by the vapor phase partial oxidation of benzene to phenol at elevated temperatures, the improvement which comprises washing the reaction vapor mixture while yet at a temperature above the dew point of the water in said vapor mixture with benzene, which is free from aqueous condensate from the mixture, so as to wash phenol from the mixture, and thereafter cooling the vapor mixture in the presence of a water-soluble alkaline material so as to condense benzene and an aqueous condensate, said alkaline material being present in amount sufficient to neutralize the acidic constituents of the condensate, whereby free phenol is condensed and recovered from said vapor mixture before residual acidic constituents are recovered in the form of their reaction products with said alkaline material.

11. In the manufacture of phenol by the vapor phase partial oxidation of benzene to phenol by mixing benzene vapor with gaseous oxygen and reacting the benzene and oxygen, thereby forming a reaction vapor mixture comprising phenol, benzene, water and a minor proportion of organic acidic material, the improvement which comprises (1) washing the reaction vapor mixture in the absence of an aqueous liquid with liquid benzene while maintaining the vapor mixture at temperatures above the dewpoint of the water therein at which the phenol is absorbed in the liquid benzene but most of the non-phenolic content of the vapor mixture remains in the vapor phase, (2) cooling the remaining vapor mixture to a temperature at which the benzene vapor is condensed therefrom to form liquid benzene together with an aqueous condensate, (3) separating the aqueous condensate from the liquid benzene and (4) using at least part of the thus dewatered benzene as wash liquid for washing phenol from additional reaction vapor mixture as described in (1) aforesaid.

12. In the manufacture of phenol by the vapor phase partial oxidation of benzene to phenol by subjecting to a temperature between about 200° and 1000° C. a mixture of benzene vapor and oxygen-containing gas containing a volume ratio of elemental oxygen to benzene vapor between about 0.02:1 and about 0.8:1, the improvement which comprises washing the reaction vapor mixture containing phenol and water vapor with benzene at ½ to 2 atmospheres pressure and at a temperature above 50° C., at which there is no condensation of water from said vapor mixture, cooling the washed mixture to condense benzene and an aqueous condensate, separating the benzene and aqueous condensate, and using at least a part of the thus dewatered benzene as wash liquid for washing phenol from additional reaction vapor mixture.

FRANK PORTER.

REFERENCES CITED

The following references are of record in the file of this patent:

UNITED STATES PATENTS

| Number | Name | Date |
| --- | --- | --- |
| 2,223,383 | Moyer et al. | Dec. 3, 1940 |

FOREIGN PATENTS

| Number | Country | Date |
| --- | --- | --- |
| 439,356 | Great Britain | Dec. 2, 1935 |
| 459,920 | Great Britain | Jan. 15, 1937 |

OTHER REFERENCES

Bibb, Ind. Eng. Chem., 21, pages 635–638 (1929).